J. R. McWANE.
PIPE JOINT.
APPLICATION FILED NOV. 8, 1917.
1,270,309.
Patented June 25, 1918.
4 SHEETS—SHEET 1.
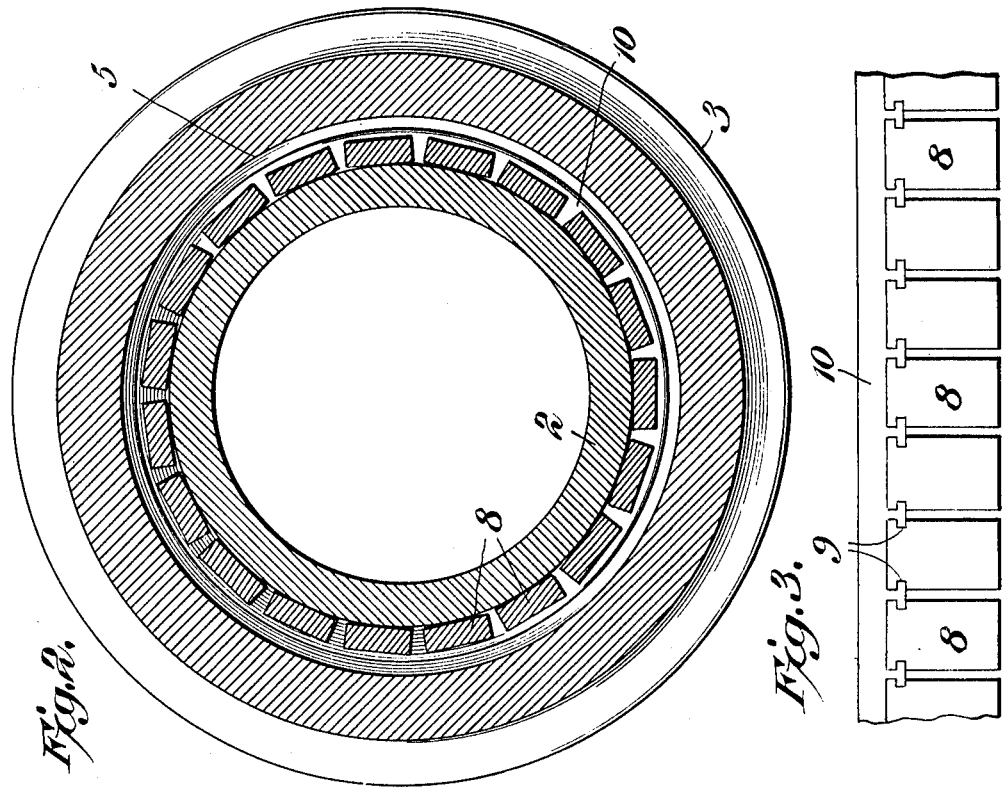
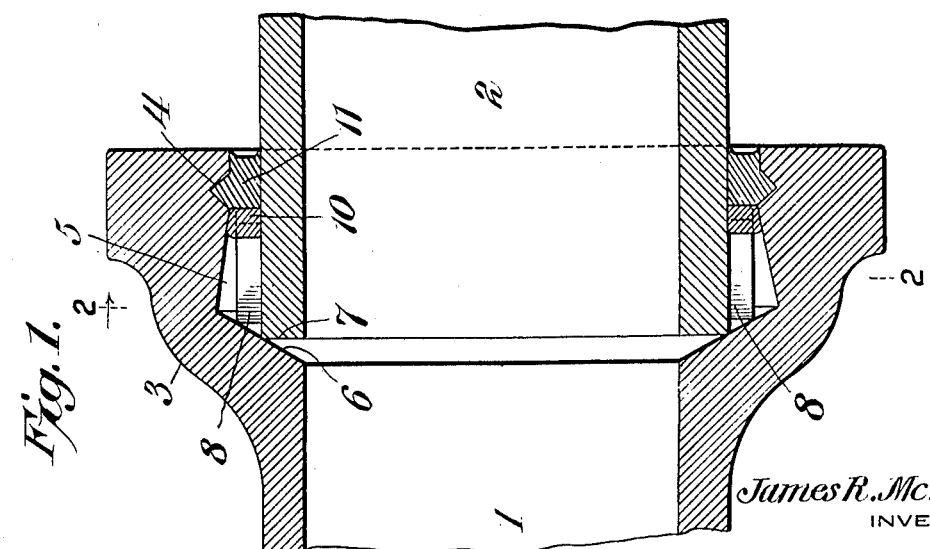
James R. McWane,
INVENTOR,
WITNESSES
Howard D. Orr.
F. J. Chapman.
BY E. G. Siggers
ATTORNEY

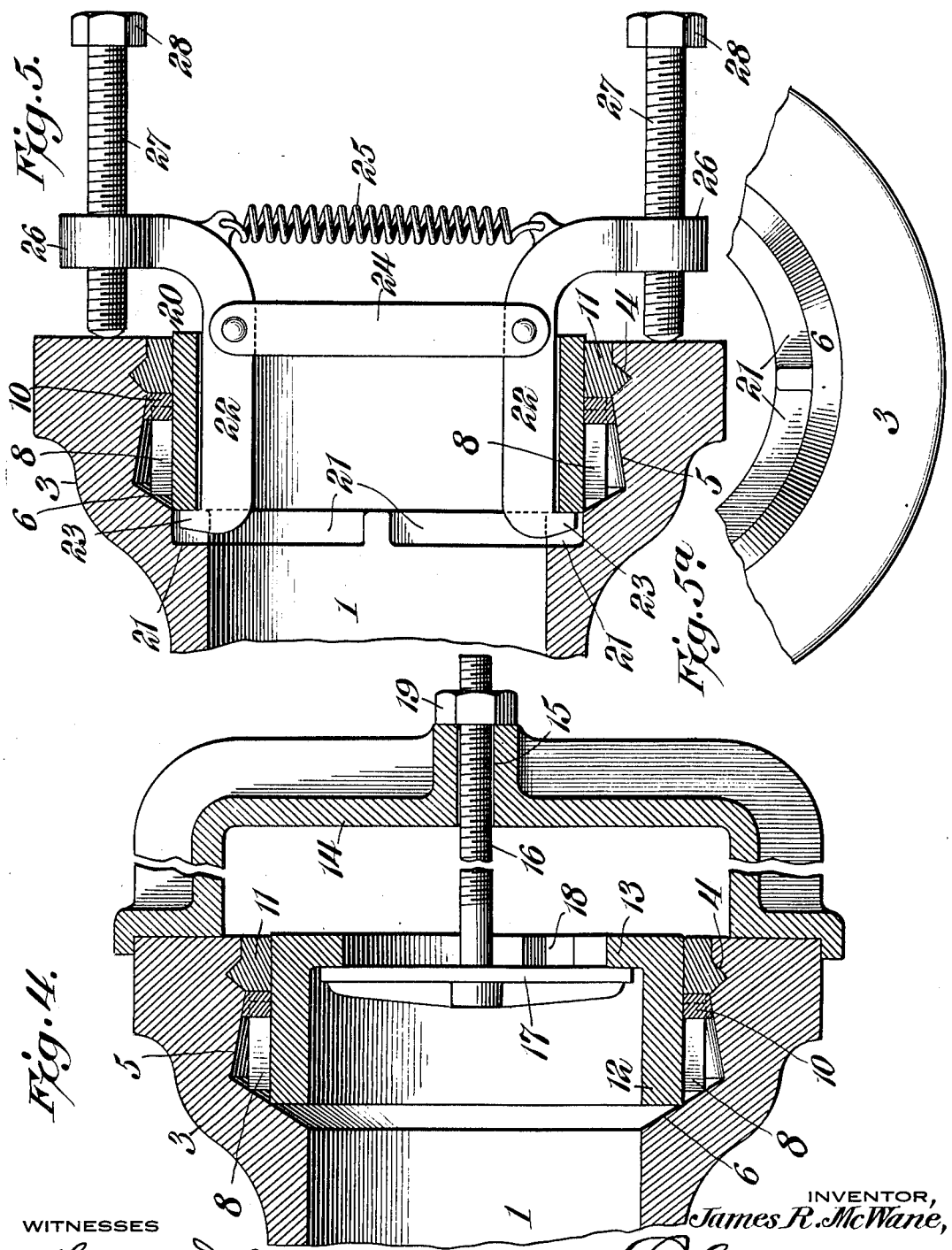

J. R. McWANE.
PIPE JOINT.
APPLICATION FILED NOV. 8, 1917.
1,270,309.
Patented June 25, 1918.
4 SHEETS—SHEET 3.
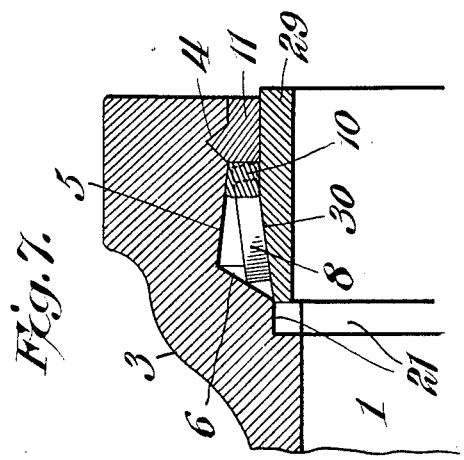
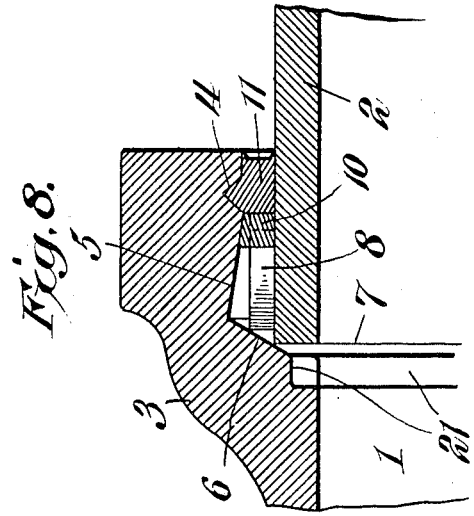
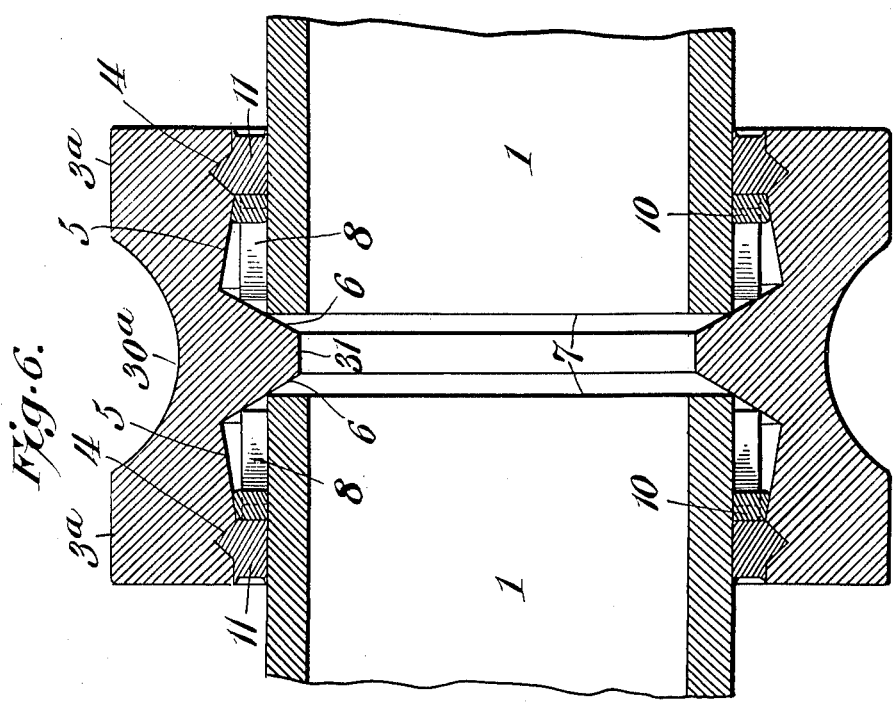
James R. McWane,
INVENTOR,
WITNESSES
Howard D. Orr.
F. T. Chapman.
BY
E. G. Siggers.
ATTORNEY

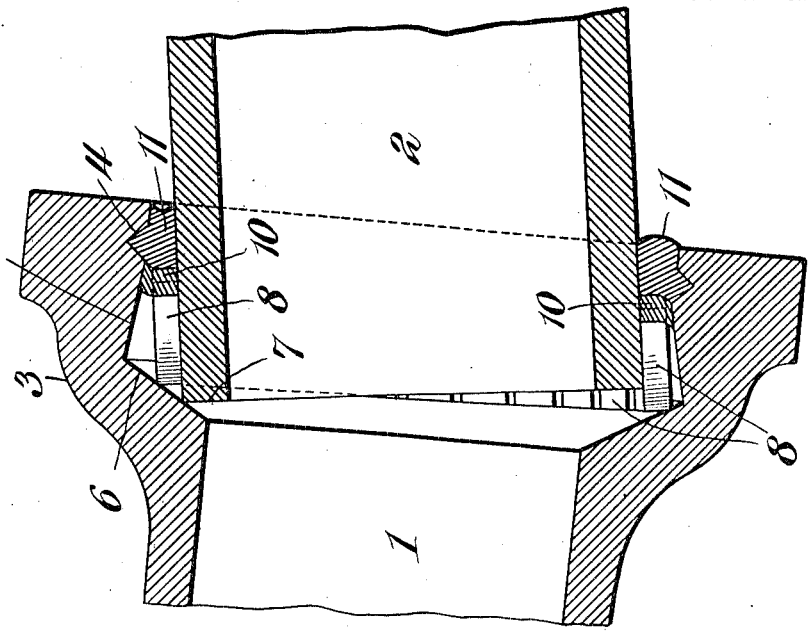
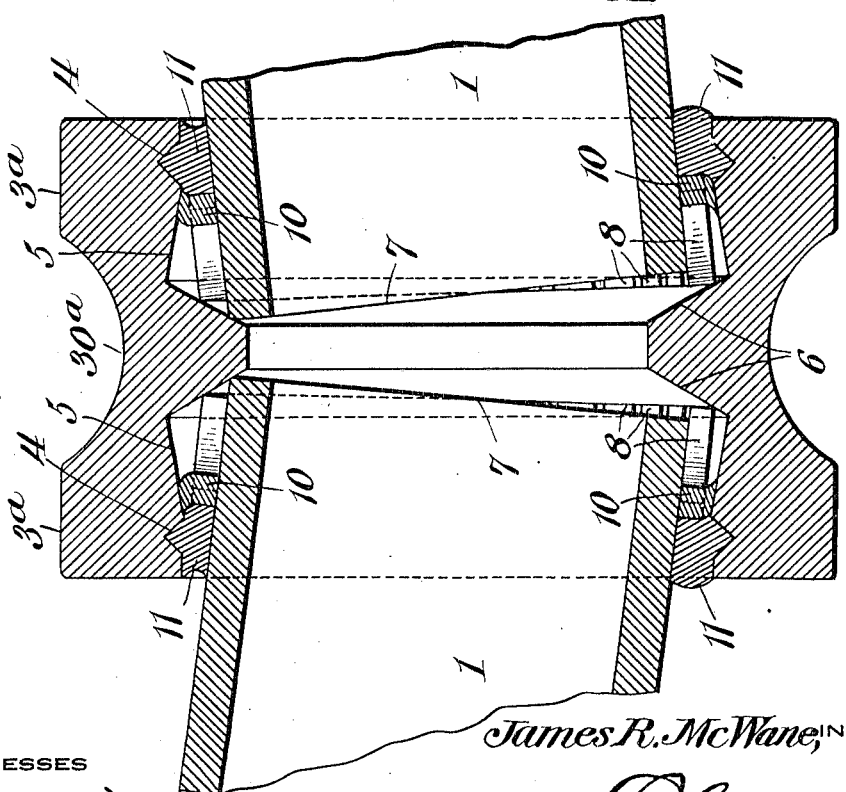

UNITED STATES PATENT OFFICE.

JAMES R. McWANE, OF BIRMINGHAM, ALABAMA.

PIPE-JOINT.

1,270,309.

Specification of Letters Patent. Patented June 25, 1918.

Application filed November 8, 1917. Serial No. 200,902.

*To all whom it may concern:*

Be it known that I, JAMES R. MCWANE, a citizen of the United States, residing at Birmingham, in the county of Jefferson and State of Alabama, have invented a new and useful Pipe-Joint, of which the following is a specification.

This invention has reference to pipe joints of either the bell and spigot type or of the collar or sleeve type. In the bell and spigot pipe joint, one section of pipe is formed at one end with a bell, while the adjacent pipe has a spigot end, which is introduced into the bell and is held therein by packing, usually composed of lead and a filler, the lead being calked tightly in place to prevent leakage.

It is possible to produce similar joints where the meeting ends of the pipes are plain, and are there surrounded by a collar or coupling which is calked with lead to seal the joint.

It is the object of the invention to provide a joint for cast iron and similar pipes which may be prepared at the foundry or factory and requiring only the assemblage of the pipes at the trench or in the field, with the result that there is great economy in the use of lead, which is commonly used as the sealing material, and wastage is entirely eliminated.

In accordance with the invention, the adjacent ends of the pipe whether of the bell and spigot type or whether a sleeve be substituted for the bell, in which latter case the sleeve is in effect a double bell, there is provided a series of metal filler blocks held together along one edge by a lead strip cast onto the filler blocks so that the strip may be bent into circular shape and introduced into the bell, or may be initially cast in ring shape and inserted and calked, so as to seal up the chamber back of it.

This is done against a temporary plug or sleeve within the bell which plug or sleeve in the larger sizes of pipe is of slightly greater diameter than the spigot end of the pipe so as to permit the spigot end to be easily introduced into the prepared bell after the plug is removed.

After the chamber is sealed by the lead on the blocks, molten lead is poured into the bell and subsequently calked around the plug or sleeve.

The plug may or may not accompany the pipe to the trench and, when present, is pulled. Then the spigot end of the pipe is inserted in the bell and the lead is calked again to thoroughly seal the joint. This recalking is, however, unnecessary in the smaller sizes, since it is possible to automatically calk the lead by the insertion of the spigot end, as will hereinafter appear. In this way, the mouth end of the bell or sleeve is sealed. Any deflection of the joint due to settling of the pipe line or any other cause tends to force the metal filler blocks along an inclined wall formed in the bell, thereby forcing the blocks toward the mouth of the bell, permitting deflection of the pipes and at the same time more tightly forcing the lead into contact with the adjacent walls of both pipes. In this way, deflections which previously were productive of leaks only serve to tightly seal or automatically calk the deflected joint, whereby leakage under the circumstances named is entirely eliminated.

When the sleeve is employed to join like ends of two pipes, the opposite ends of the sleeve are so formed as to constitute in effect two opposite bells into which the plain ends of the adjacent pipes are introduced in the same manner that the spigot end of a pipe is ordinarily introduced into the bell end of a matching pipe in the production of bell and spigot joints.

The invention also contemplates other features and structures whereby the handling of the pipe is facilitated and liability of loss from accident or theft is eliminated.

The invention will be best understood from a consideration of the following detailed description, taken in connection with the accompanying drawings forming part of this specification, with the further understanding that, while the drawings show a practical form of the invention, the latter is not confined to any strict conformity with the showing of the drawings but may be changed and modified so long as such changes and modifications come within the scope of the appended claims.

In the drawings:

Figure 1 is a longitudinal diametric section of a joint embodying the invention and produced with bell and spigot cast iron pipe;

Fig. 2 is a section on the line 2—2 of Fig. 1;

Fig. 3 is a plan view of a portion of a connected series of metal filler blocks used in the joint;

Fig. 4 is a section similar to Fig. 1, but omitting the spigot end of the pipe and showing in place thereof a plug designed to be ultimately removed to make way for the spigot end of the pipe to be joined to the bell end of the other pipe;

Fig. 5 is a view similar to Fig. 4 but showing a somewhat modified construction;

Fig. 5ª is a fragmentary end view of the pipe shown in Fig. 5;

Fig. 6 is a longitudinal diametric section of a joint between two plain pipes and a coupling sleeve embodying the invention;

Fig. 7 is a section similar to others of the sections and showing another form of plug whereby the parts are assembled to provide for self-calking;

Fig. 8 is a view of the pipe joint of Fig. 7 after the introduction of the spigot end of the companion pipe completing the joint.

Figs. 9 and 10 are views similar to Figs. 6 and 1 respectively, showing the pipes at the joint deflected.

Since the sleeve type of joint is, so far as the joint itself is concerned, but a duplication at the opposite ends of the sleeve of the bell and spigot joint, the term bell and spigot joint will be employed for both the bell and spigot joint proper and the sleeve joint.

Referring first to Fig. 1 and companion figures, there are shown two sections 1 and 2 of pipe, which sections are connected by a joint embodying the invention.

The pipe 1 is provided with a bell end 3 corresponding generally to the bell end of standard bell and spigot pipe, but differing therefrom in some particulars. The bell end has the usual lead-receiving groove 4 back of which the interior of the bell widens in diameter to produce a deeper groove 5 having a wall 6 tapering toward the interior of the pipe by an angle which may be or approximates 30° more or less.

The pipe 2 has a plain extremity 7, since with the invention the usual exterior bead at the spigot end of the pipe is not needed.

There is also provided a series of blocks 8 which may be formed of steel, and these blocks, which are usually flat rectangular blocks somewhat longer than wide, have matching grooves 9 on opposite edges near one end. These grooves or notches constitute anchorages for a lead strip 10 cast thereinto, thus holding the blocks together in a series in slightly spaced relation, while the lead strip may be bent into circular shape, or initially cast in such shape, thus producing a substantially circular series of blocks for introduction into the bell end of the pipe around a plug or former, previously placed in the bell. By calking the lead ring 10 the lead is spread and seals the space or groove 5 back of the ring. The plug or former may be made to conform in diameter closely to that of the spigot end of the pipe to be introduced into the bell. Then lead 11 is poured into the bell end to fill the latter from the seal formed by the calked ring 10 to the mouth of the bell or nearly so. The calking is continued until the lead is well compacted in the bell end, and in the groove 4.

In the larger sizes the plug is not removed until the pipe reaches the trench. Then the spigot end of the pipe is introduced into the prepared bell, which has the spigot receptacle slightly oversize because the plug is slightly larger than the spigot end of the pipe. The lead is now recalked, completing the joint.

The whole proceeding represents a very material saving in relatively expensive material (lead) and in labor, both in forming the joint and laying the pipe in the trench.

Suppose, however, that the pipes at the joint become deflected, due to settling or other causes, see Fig. 9. Such condition means that the bottom of the pipe 2 will encroach on the chamber 5, while at the top the pipe 2 approaches that portion of the bell containing the groove 4. The encroaching of the bottom of the pipe 2 on the chamber 5 at the bottom of the bell forces the blocks or wedges 8 there located along the wall 6, and this wall being in angular relation to the length of the pipe in turn forces the blocks 8 there located toward the mouth of the bell and tends to more firmly compact the lead 10 against the lead 11 so that the portion of the joint made up of the lead 10 and 11 is automatically forced into tighter contact with the shoulder of the groove 4 and the walls of the pipe sections 1 and 2. The top of the pipe 2 at the same time squeezes the lead 11 into the groove 4, thus also maintaining the joint tight. At the sides the original tight condition is not disturbed by the relative deflection of the pipes.

Such a joint, so far as the lead and filler blocks are concerned, may be produced at the foundry or factory. In order to do this, there is provided a plug 12 shown in Fig. 4, as a sleeve of a slightly greater external diameter than the pipe 2, which sleeve is of a length to fill the bell 3 lengthwise. With such an arrangement, the blocks or wedges 8 are located in the bell and the lead ring 10 and lead filler 11 are introduced and firmly calked. Under the favorable conditions present at the factory, such preliminary joint is readily produced by operatives who become skilled in the work and can utilize the minimum quantity of lead without wastage, and at the same time produce a better result than is possible in the field or trench, where it is almost impossible to prevent spilling some of the molten lead and where more than the necessary quantity of lead is used.

The plug 12 is designed to remain in the bell end of the pipe until the pipe is ready for laying, to protect the installed packing material during transportation and such handling as may be necessary, and also to prevent theft of the lead. When the pipe is laid, it is necessary to withdraw the plug 12. This may be accomplished by providing the plug 12 with an inwardly directed flange 13 at the outer end. Then a puller 14 in the form of a yoke is used, and is of a size and shape to bear against the bell end of the pipe straddling the plug 12 and sealing material held by the plug in the bell end. The puller 14 is provided with a passage 15 through its mid portion for a threaded stem 16 carrying a head or bar 17 at one end of a size to underride the flange 13. In order to introduce the head 17 behind the flange 13, the latter is slotted as indicated at 18, so that the head or bar 17 may be passed through the flange by one of the slots 18 and then partially turned.

A nut 19 applied to the threaded stem 16 provides for exerting a suitable force upon the plug to pull it out of the bell, leaving the packing material and filler blocks or wedges 8 in place. Now, the spigot end 2 of the pipe is introduced into the bell in place of the plug 12 and the joint is completed by calking the lead 11 tightly into place, this operation being readily performed in the trench. The arrangement entirely eliminates the necessity of handling molten lead in the trench, and the wasteful methods heretofore practised in producing pipe joints.

Such an arrangement as shown in Fig. 4, so far as the plug 12 is concerned, presents a possibility of driving out the plug, while the pipes are in transit or stored, whereupon a maliciously inclined person may dislodge and steal the lead, which material, because of its relatively high price, may tempt such persons to take it. To overcome this possibility, a plug 20, shown in Fig. 5, may be employed. This plug is a plain wrought iron or steel cylinder of slightly greater external diameter and of greater internal diameter than the spigot end of the pipe 2, so that there is great difficulty in driving out such a plug from the spigot end of the pipe containing the plug at its bell end. In the structure shown in Fig. 4, the flange 13 may possibly be reached by a sufficiently long bar from the spigot end of the pipe, and, therefore, be driven out. In the structure illustrated in Fig. 5, the plug 20 being of greater internal diameter than the pipe 1, offers no parts which can be reached by a rod or bar introduced into the pipe through the spigot end, since such parts are usually of considerable length, and the angle at which the bar or rod can be applied to the plug 20 is too slight to permit the bar to catch thereon.

To facilitate the pulling of the plug 20, the inner end of the bell is formed with a circular series of recesses 21, and the puller consists of two rock arms 22 each with a nose 23 at one end capable of engaging the inner end of the plug 20 by seating in the recesses 21. The arms 22 are joined by a link 24 at a point intermediate of their lengths, and the nose ends 23 may be urged outwardly by a spring 25 connecting the arms on the side of the link 24 remote from the nose ends 23. However, the spring may be omitted. Each arm 22 terminates in a head 26 at the end remote from the nose 23, and such head is tapped for the passage of a screw 27 having a head 28 shaped for the application of a turning tool such as a wrench. The arms 22 will readily yield for the introduction of these arms into the plug 20 from the outer end of the latter, and the nose ends 23 will snap behind the inner end of the plug because of the action of the spring 25. Then, by turning the screws 27 in the proper direction, the plug 20 is readily extracted.

It is quite feasible to arrange the packing material in the joints, so that on the introduction of the spigot end of the pipe into the bell end of the matching pipe, the joint will automatically pack. This is accomplished by an arrangement such as illustrated in Fig. 7, where there is provided a plug 29 similar to the plug 12 except for the absence of the flange 13, and having a tapered outer wall 30 at the end seated in the basic portion of the bell. The taper permits the wedges or blocks 8 to enter into the bell to a greater extent than in the other arrangements, those ends of the blocks remote from the lead ring 10 moving along the wall 6 to a greater depth into the bell than otherwise and consequently approaching closer to the longitudinal center line of the pipe 1. The wedge blocks 8 are therefore closer together at their inner ends than at their outer ends, and the diameter of the series is less than the outer diameter of the pipe 2. Now, when the pipes 1 and 2 are assembled after the withdrawal of the plug 29, the pipe 2 engages the wedge blocks 8 and expands the series against the inclined wall 6, with the result that the blocks are forced outwardly toward the mouth of the bell, thus compacting the lead between the shoulder of the lead groove and the walls of the pipe, thereby automatically calking the joint. The completed joint is shown in Fig. 8. It is feasible to provide all the advantages of the joint of the invention in the form of a coupling rather than what is customarily known as a bell and spigot joint. This is accomplished by providing a coupling with two integrally joined opposed bells 3ª shown in Fig. 6 as constituting a coupling 30ª, and the coupling has an intermediate interior rib 31 corresponding to the part of the pipe 1 immediately adjacent to the bell 3, and common to both bells 3ª. With such an arrangement, two pipes 2 may be connected end to end. Since the structure is otherwise identical with the arrangement shown in those figures preceding Fig. 6, and also in Figs. 7 and 8, the arrangement of Fig. 6 may be considered as illustrating bell and spigot joints except that the bell portions of the joints are united so that they constitute a coupling between adjacent ends of two spigot or plain lengths of pipe.

The plugs are shipped with the pipe in the larger sizes, since such larger sizes are more liable to be tampered with for the theft of the lead on account of the storage of such large sizes out of doors. With small sizes of pipe that can be readily stored indoors and so protected, the plugs need not be shipped with the pipe but are used only for the preliminary seating of the filler blocks and sealing lead.

Under some circumstances and for certain purposes, such as for gas pipes and the like, it may be advisable to introduce jute or other suitable packing between the leads 10 and 11, or elsewhere in the joint, but this is not to be considered as a departure from the invention.

What is claimed is:

1. A prepared self-tightening joint structure for pipe comprising bell and spigot portions with a series of wedge blocks for constituting a backing for sealing lead, and the bell having a basic portion against which the blocks abut and at an angle to the diameter of the pipe to cause the blocks to move toward the mouth end of the bell under forces directed laterally of the length of the pipe, thereby being self-tightening under deflection of the laid pipe.

2. A prepared self-tightening joint structure for pipe comprising bell and spigot portions with the basic end of the bell presenting a wall at an angle approximating thirty degrees, (30°) to the diameter of the pipe, a series of blocks for location in the bell about the spigot end of a pipe introduced therein and engaging the angle wall, and lead filling between the outer ends of the blocks and the mouth of the bell.

3. A prepared self-tightening joint structure for pipe comprising bell and spigot portions with the basic end of the bell presenting a wall at an angle approximating thirty degrees, (30°) to the diameter of the pipe, a series of blocks for location in the bell about the spigot end of a pipe introduced therein and engaging the angle wall, and lead filling between the outer ends of the blocks and the mouth of the bell, said lead filling being in part carried by and joining the blocks.

4. A prepared and protected pipe joint structure comprising a bell member, a sleeve constituting a plug introduced into the bell member and of a diameter slightly greater than that of the spigot end of the pipe, and of a length to lodge in the bell without material projection therefrom, and packing material lodged in the bell exterior to the plug and associated with the bell member and the plug as in a laid pipe, whereby the pipe may be shipped with the sleeve in the bell to protect the packing against injury in handling or theft.

5. A prepared and protected joint structure for bell and spigot pipe for assemblage preliminary to the introduction of the spigot end of a pipe into the bell end thereof, comprising a bell pipe end, a series of metal filler blocks introduced into the basic portion of the bell and having a lead strip connecting the outer ends of the blocks, lead packing between the lead strip and the mouth of the bell, and a temporary plug for substitution by the spigot end of the pipe to be introduced into the bell and against which the lead is calked.

6. A prepared joint structure adapted for internal calking of bell and spigot pipe joints for assemblage preliminary to the introduction of the spigot end of a pipe into the bell end thereof, comprising a bell pipe end, a series of metal filler blocks introduced into the basic portion of the bell and having a lead strip connecting the outer ends of the blocks, lead packing between the lead strip and the mouth of the bell, and a temporary plug for substitution by the spigot end of the pipe to be introduced into the bell and against which the lead is calked, said plug having an exterior taper located opposite the installed blocks, whereby they become lodged in the bell in a circular series tapering toward the longitudinal center line of the bell at the basic end thereof, and whereby the lead may be automatically calked by the forcible introduction of the spigot end of the pipe.

7. A prepared joint structure for plain end pipe including a coupling sleeve with bells at opposite ends, a series of filler blocks in each end, a lead strip connecting the outer ends of the blocks of each series, and lead packing between each lead strip and the mouth of the respective bell.

8. A prepared joint structure for plain end pipe including a coupling sleeve with bells at opposite ends, a series of filler blocks in each end, a lead strip connecting the outer ends of the blocks of each series, and lead packing between each lead strip and the mouth of the respective bell, said bell ends each having its inner end engaged by the blocks and sloping at an angle to the diameter of the pipe to cause the blocks to move toward the mouth end of the bell under forces directed laterally to the length of the pipe thereby being self-tightening under deflection of the laid pipe.

In testimony that I claim the foregoing as my own, I have hereto affixed my signature in the presence of two witnesses.

JAMES R. McWANE.

Witnesses:
JOHN H. SIGGERS,
E. G. SIGGERS.